(12) United States Patent  
Hall et al.

(10) Patent No.: US 6,523,402 B1
(45) Date of Patent: Feb. 25, 2003

(54) ATTITUDE INDICATOR DEVICE

(76) Inventors: Charles I. Hall, 775 Ryerson Rd., Franklin Lakes, NJ (US) 07417; Jacqueline D. Hall, 775 Ryerson Rd., Franklin Lakes, NJ (US) 07417

( * ) Notice: Subject to any disclaimer, the term of this patent is extended or adjusted under 35 U.S.C. 154(b) by 0 days.

(21) Appl. No.: 09/931,811

(22) Filed: Aug. 17, 2001

(51) Int. Cl.[7] .............................................. G01P 13/00
(52) U.S. Cl. ................................................... 73/170.02
(58) Field of Search ..................... 73/170.02; 33/348.2; 362/802

(56) References Cited

U.S. PATENT DOCUMENTS

| 2,551,338 A | | 5/1951 | Rogers | |
|---|---|---|---|---|
| 3,584,212 A | | 6/1971 | Hansen | |
| 3,813,556 A | * | 5/1974 | Beer et al. | 250/575 |
| 4,005,938 A | * | 2/1977 | Ho | 356/149 |
| D271,088 S | | 10/1983 | Ebner | |
| 4,912,854 A | | 4/1990 | Weadon | |
| 5,020,232 A | * | 6/1991 | Whiteford | 33/483.2 |
| 5,067,667 A | | 11/1991 | Shivers, Jr. | |
| 5,075,978 A | * | 12/1991 | Crowe | 33/348.2 |
| 5,402,107 A | * | 3/1995 | Rencavage | 340/573 |
| 5,761,818 A | | 6/1998 | Hopkins et al. | |

* cited by examiner

Primary Examiner—Hezron Williams
Assistant Examiner—Andre Allen

(57) ABSTRACT

An attitude indicator device for allowing a pilot to determine an aircraft's attitude in case of instrument or power failure. The attitude indicator device includes an L-shaped housing member with a plurality of spirit levels, each lighted utilizing a solar power source and backed up by batteries, that allows a pilot to determine an aircraft's attitude without instrumentation or power from the plane.

17 Claims, 2 Drawing Sheets

ATTITUDE INDICATOR DEVICE

BACKGROUND OF THE INVENTION

1. Field of the Invention

The present invention relates to attitude indicator devices and more particularly pertains to a new attitude indicator device for allowing a pilot to determine an aircraft's attitude in case of instrument or power failure.

2. Description of the Prior Art

The use of attitude indicator devices is known in the prior art. More specifically, attitude indicator devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,551,338; U.S. Pat. No. 3,584,212; U.S. Pat. No. 4,912,854; U.S. Pat. No. 5,761,818; U.S. Pat. No. 5,067,667; and U.S. Pat. No. Des. 271,088.

While these devices fulfill their respective, particular objectives and requirements, the aforementioned patents do not disclose a new attitude indicator device. The inventive device includes an L-shaped housing member with a plurality of spirit levels, each lighted utilizing a solar power source and backed up by batteries, that allows a pilot to determine an aircraft's attitude without instrumentation or power from the plane.

In these respects, the attitude indicator device according to the present invention substantially departs from the conventional concepts and design-s of the prior art, and in so doing provides an apparatus primarily developed for the purpose of allowing a pilot to determine an aircraft's attitude in case of instrument or power failure.

SUMMARY OF THE INVENTION

In view of the foregoing disadvantages inherent in the known types of attitude indicator devices now present in the prior art, the present invention provides a new attitude indicator device construction wherein the same can be utilized for allowing a pilot to determine an aircraft's attitude in case of instrument or power failure.

The general purpose of the present invention, which will be described subsequently in greater detail, is to provide a new attitude indicator device apparatus and method which has many of the advantages of the attitude indicator devices mentioned heretofore and many novel features that result in a new attitude indicator device which is not anticipated, rendered obvious, suggested, or even implied by any of the prior art attitude indicator devices, either alone or in any combination thereof.

To attain this, the present invention generally comprises an L-shaped housing member with a plurality of spirit levels, each lighted utilizing a solar power source and backed up by batteries, that allows a pilot to determine an aircraft's attitude without instrumentation or power from the plane.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out,the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new attitude indicator device apparatus and method which has many of the advantages of the attitude indicator devices mentioned heretofore and many novel features that result in a new attitude indicator device which is not anticipated, rendered obvious, suggested, or even implied by any of the prior art attitude indicator devices, either alone or in any combination thereof.

It is another object of the present invention to provide a new attitude indicator device which may be easily and efficiently manufactured and marketed.

It is a further object of the present invention to provide a new attitude indicator device which is of a durable and reliable construction.

An even further object of the present invention is to provide a new attitude indicator device which is susceptible of a low cost of manufacture with regard to both materials and labor, and which accordingly is then susceptible of low prices of sale to the consuming public, thereby making such attitude indicator device economically available to the buying public.

Still yet another object of the present invention is to provide a new attitude indicator device which provides in the apparatuses and methods of the prior art some of the advantages thereof, while simultaneously overcoming some of the disadvantages normally associated therewith.

Still another object of the present invention is to provide a new attitude indicators device for allowing a pilot to determine an aircraft's attitude in case of instrument or power failure.

Yet another object of the present invention is to provide a new attitude indicator device which includes an L-shaped housing member with a plurality of spirit levels, each lighted utilizing a solar power source and backed up by batteries, that allows a pilot to determine an aircraft's attitude without instrumentation or power from the plane.

Still yet another object of the present invention is to provide a new attitude indicator device that is self-contained and non-mechanical, assuring the pilot a working attitude display device even in the event of instrumentation or power failure, thereby possibly saving his life.

Even still another object of the present invention is to provide a new attitude indicator device that is compact and easily stored in the cockpit where it could be readily available in case of an emergency.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detaiLed description thereof. Such description makes reference to the annexed drawings wherein.

DESCRIPTION OF THE PREFERRED EMBODIMENT

Figure 1:
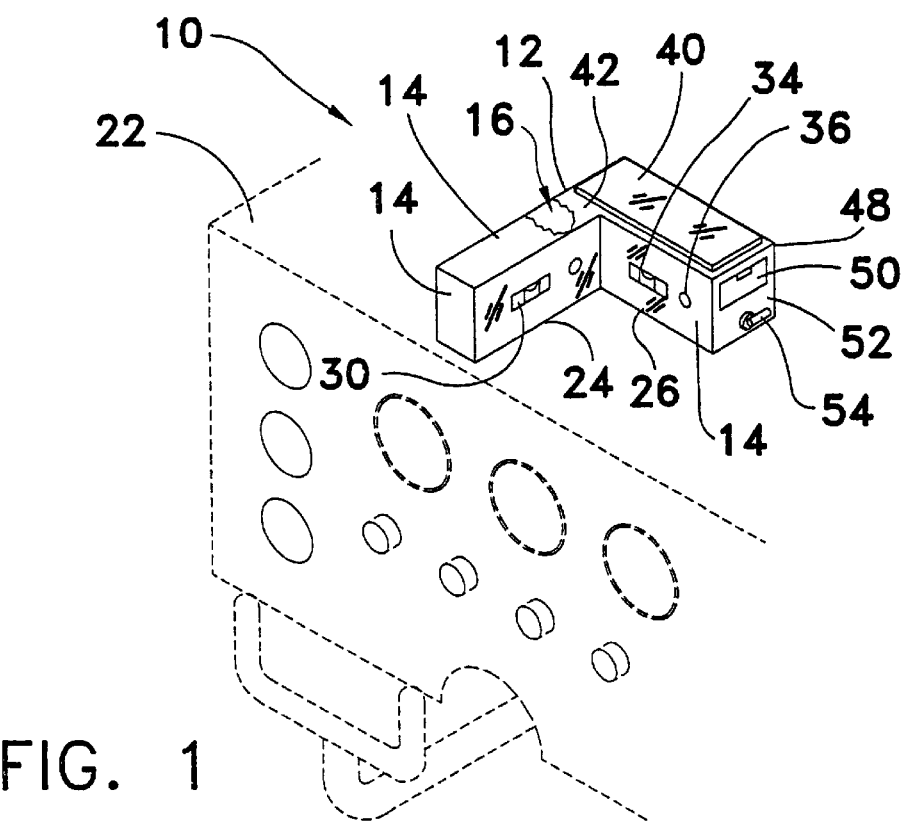
FIG. 1 is a perspective view of a new attitude indicator device according to the present invention.
Figure 2:
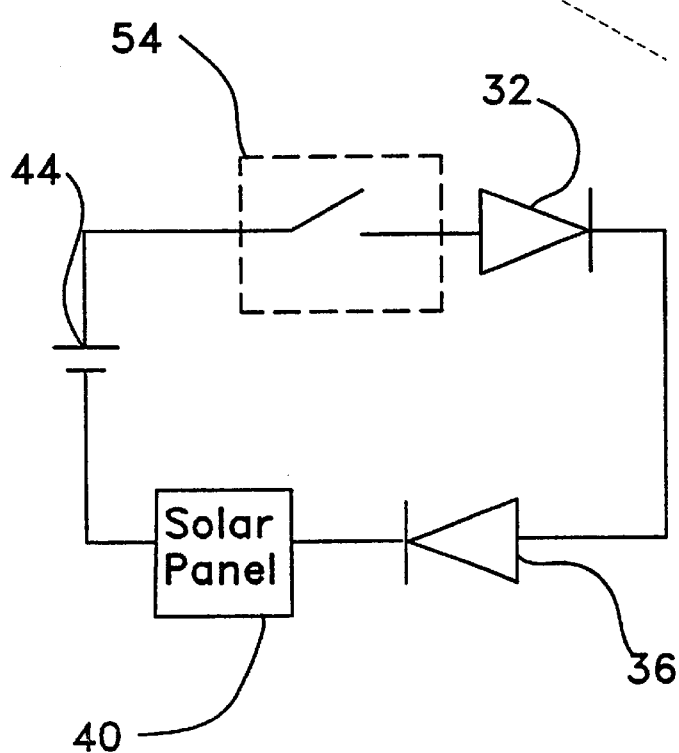
FIG. 2 is a front view of the present invention.
Figure 3:
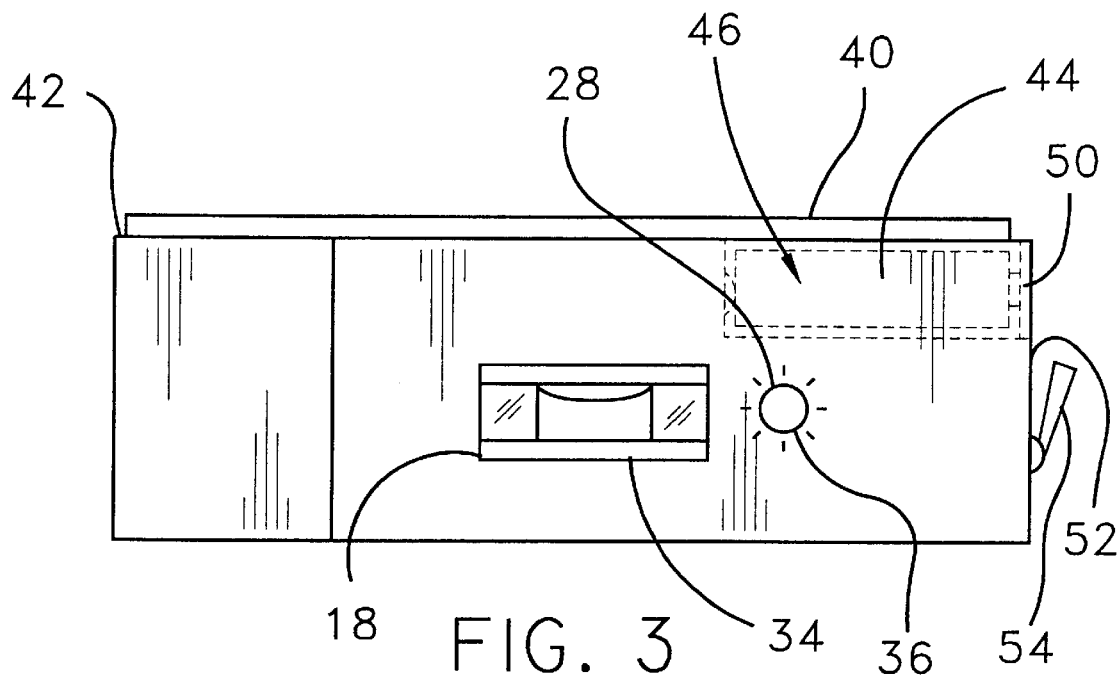
FIG. 3 is a side view of the present invention.
Figure 4:
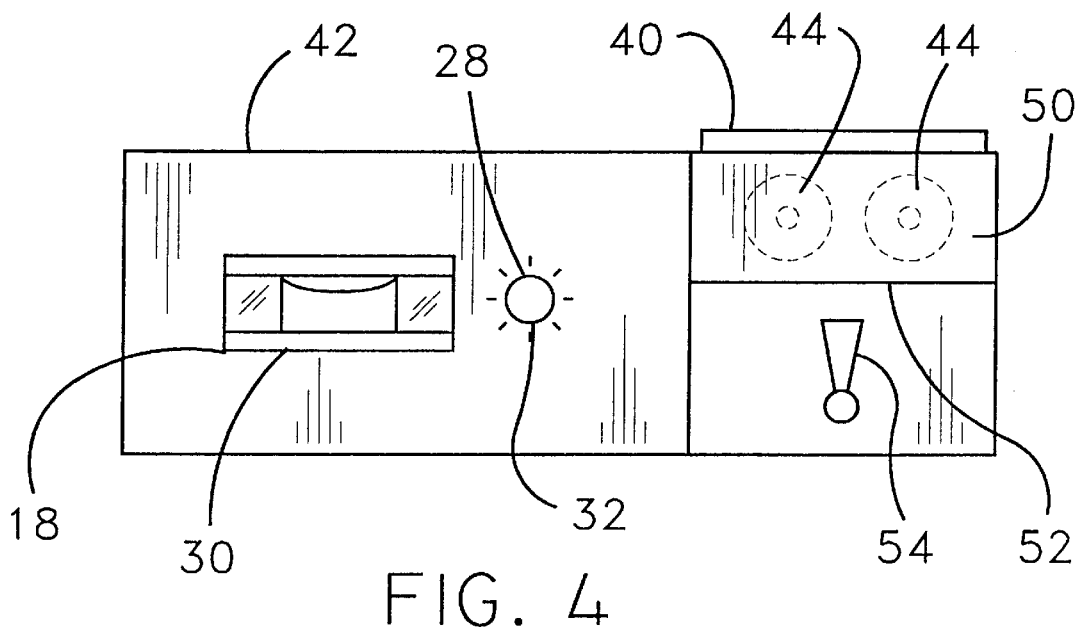
FIG. 4 is an electrical schematic of the present invention.

With reference now to the drawings, and in particular to FIGS. 1 through 4 thereof, a new attitude indicator device embodying the principles and concepts of the present invention and generally designated by the reference numeral 10 will be described.

As best illustrated in FIGS. 1 through 4, the attitude indicator device 10 generally comprises a main housing member 12. The main housing member 12 is substantially L-shaped. The main housing member 12 has perimeter walls 14. The perimeter walls 14 define an interior space 16.

The main housing member 12 has a plurality of spirit levels 18. The spirit levels 18 are positioned in the interior space 16 of the main housing member 12. The spirit levels 18 are designed for indicating the relative orientation of an airplane when the main housing member 12 is positioned on a dashboard 22 of the airplane such that the spirit levels 18 give the pilot visual indications of the airplane's attitude.

The main housing member 12 comprises a first portion 24 and a second portion 26. The portions 24,26 are oriented at a right angle to each other such that the spirit levels 18 in the main housing member 12 indicate the attitude of the airplane.

The main housing member 12 includes a plurality of light members 28. The light members 28 are positioned proximate the spirit levels 18 such that the light members 28 are designed for illuminating the spirit levels 18.

The first portion 24 of the main housing member 12 includes a y-axis spirit level 30. The y-axis spirit level 30 is positioned such that a longitudinal axis of the y-axis spirit level 30 is substantially parallel to a longitudinal axis of the first portion 24. The y-axis spirit level 30 is designed for indicating a pitch attitude of the airplane.

The first portion 24 of the main housing, member 12 includes a y-axis light member 32. The y-axis light member 32 is designed for illuminating the y-axis-spirit level 30.

The second portion 26 of the main housing member 12 includes an x-axis spirit level 34. The x-axis spirit level 34 is positioned such that a longitudinal axis of the x-axis spirit level 34 is substantially parallel to a longitudinal axis of the second portion 26. The x-axis spirit level 34 is designed for indicating a roll attitude of the airplane.

The second portion 26 of the main housing member 12 includes an x-axis light member 36. The x-axis light member 36 is designed for illuminating the x-axis spirit level 34.

The second portion 26 of the main housing member 12 includes a solar power source plate member 40. The solar power source plate member 40 is fixedly coupled to a top surface 42 of the second portion 26 of the main housing member 12. The solar power source plate member 40 is designed for providing power to the light members 28.

The second portion 26 of the main housing member 12 includes a battery source 44. The battery source 44 is positioned in a battery compartment 46 located proximate a distal end 48 of the second portion 26 of the main housing member 12.

The battery source 44 is designed for providing backup power to the light members 28 such that the light members 28 would continue to illuminate the spirit levels 18 if the solar power source plate member 40 were not producing electricity.

The battery source 44 is continuously recharged by the solar power source plate member 40 when the solar power source plate member 40 is producing electricity, thereby maintaining a full charge in the battery source 44.

The battery compartment 46 of the second portion 26 includes a battery cover 50. The battery cover 50 is positioned on an end surface 52 of the distal end 48 of the second portion 26 such that the battery cover 50 is designed for retaining the battery source 44 in the battery compartment 46.

The second portion 26 of the main housing member 12 includes a power switch 54. The power switch 54 is positioned on the end surface 52 of the distal end 48 of the second portion 26. The power switch 54 is operationally coupled to the light members 28, the solar power source plate member 40, and the battery source 44 such that the power switch 54 is designed for manually operating the light members 28.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An attitude indicator device for allowing a pilot to determine an aircraft's attitude in the case of instrument or power failure, the attitude indicator device comprising:

a housing member comprising an elongate first portion and an elongate second portion, each of said portions having a top surface and a bottom surface, longitudinal axes of each of said portions being oriented substantially perpendicular to each other;

each of said portions of said housing member having walls defining an interior space;

a plurality of spirit levels, each of said spirit levels being positioned in said interior space of one of said portions of said housing member, each of said spirit levels being visible through one of said inner faces;

a longitudinal axis of each of said spirit levels being oriented substantially parallel to the longitudinal axis of said portion of said housing on which said spirit level is mounted such that at least two of said spirit levels are oriented perpendicular to each other to indicate relative orientation of an airplane with respect to level flight when said housing member is mounted in the airplane in an orientation that is substantially horizontal when the air plane is in level flight for providing the pilot with visual indications of pitch and roll conditions of the airplane and thereby permitting the pilot to maintain level flight without utilization of standard indicator instruments of the airplane.

2. The attitude indicator device as set forth in claim 1, further comprising:

said housing member including a plurality of light members, said light members being positioned adjacent to said spirit levels such that said light members illuminate said spirit levels to permit the pilot to see said spirit levels in dark conditions.

3. The attitude indicator device as set forth in claim 1, further comprising:

said first portion of said housing member including a pitch-axis spirit level, said pitch-axis spirit level being positioned such that a longitudinal axis of said pitch-axis spirit level is substantially parallel to a longitudinal axis of said first portion, said pitch-axis spirit level being adapted for indicating the pitch condition of the airplane; and said first portion of said housing member including an pitch-axis light member, said pitch-axis light member being adapted for illuminating said pitch-axis spirit level.

4. The attitude indicator device as set forth in claim 1, further comprising:

said second portion of said housing member including an roll-axis spirit level, said roll-axis spirit level being positioned such that a longitudinal axis of said roll-axis spirit level is substantially parallel to a longitudinal axis of said second portion, said roll-axis spirit level being adapted for indicating a roll attitude of the airplane; and said second portion of said housing member including an roll-axis light member, said roll-axis light member being adapted for illuminating said roll-axis spirit level.

5. The attitude indicator device as set forth in claim 1, further comprising:

a solar power source plate member mounted on said housing for providing power to said light members, said solar power source plate member being coupled to said top surface of said housing.

6. The attitude indicator device as set forth in claim 5, further comprising:

a battery source located in a battery compartment in said housing and being electrically coupled to said light members and said solar power source plate member;

said battery source being continuously recharged by said solar power source plate member when said solar power source plate member is producing electricity thereby maintaining a full charge in said battery source so that said battery source provides backup power to said light members when said solar power source plate member is not producing electricity due to a lack of light.

7. The attitude indicator device as set forth in claim 6, further comprising:

said battery compartment of said second portion including a battery cover, said battery cover being positioned on an end surface of said distal end of said second portion such that said battery cover is adapted for retaining said battery source in said battery compartment.

8. The attitude indicator device as set forth in claim 7, further comprising:

a power switch for permitting manual operation of said light members, said power switch being mounted on said housing member and being electrically coupled to said light members, said solar power source plate member, and said battery source.

9. An attitude indicator device for allowing a pilot to determine an aircraft's attitude in the case of instrument or power failure, the attitude indicator device comprising:

a housing member comprising an elongate first portion and an elongate second portion, each of said portions having a top surface and a bottom surface, each of said portions having an inner face positioned perpendicular to the inner face of the other said portion, longitudinal axes of each of said portions being oriented substantially perpendicular to each other;

each of said portions of said housing member having walls defining an interior space;

a plurality of spirit levels, each of said spirit levels being positioned in said interior space of one of said portions of said housing member, each of said spirit levels being visible through one of said inner faces;

a longitudinal axis of each of said spirit levels being oriented substantially parallel to the longitudinal axis of said portion of said housing on which said spirit level is mounted such that at least two of said spirit levels are oriented perpendicular to each other to indicate relative orientation of an airplane with respect to level flight when said housing member is mounted in the airplane in an orientation that is substantially horizontal when the air plane is in level flight for providing the pilot with visual indications of pitch and roll conditions of the airplane and thereby permitting the pilot to maintain level flight without utilization of standard indicator instruments of the airplane;

wherein said housing member includes a plurality of light members, said light members being positioned adjacent to said spirit levels such that said light members illuminate said spirit levels to permit the pilot to see said spirit levels in dark conditions;

wherein said first portion of said housing member includes a pitch-axis spirit level, said pitch-axis spirit level being positioned such that a longitudinal axis of said pitch-axis spirit level is substantially parallel to a longitudinal axis of said first portion, said pitch-axis spirit level being adapted for indicating the pitch condition of the airplane;

wherein said first portion of said housing member includes an pitch-axis light member, said pitch-axis light member being adapted for illuminating said pitch-axis spirit level;

wherein said second portion of said housing member includes an roll-axis spirit level, said roll-axis spirit level being positioned such that a longitudinal axis of said roll-axis spirit level is substantially parallel to a longitudinal axis of said second portion, said roll-axis spirit level being adapted for indicating a roll attitude of the airplane;

wherein said second portion of said housing member includes an roll-axis light member, said roll-axis light member being adapted for illuminating said roll-axis spirit level;

a solar power source plate member being mounted on said housing for providing power to said light members, said solar power source plate member being coupled to said top surface of said housing;

a battery source being located in a battery compartment in said housing and being electrically coupled to said light members and said solar power source plate member;

wherein said battery source is continuously recharged by said solar power source plate member when said solar power source plate member is producing electricity thereby maintaining a full charge in said battery source so that said battery source provides backup power to said light members when said solar power source plate member is not producing electricity due to a lack of light;

wherein said battery compartment of said second portion includes a battery cover, said battery cover being positioned on an end surface of said distal end of said second portion such that said battery cover is adapted for retaining said battery source in said battery compartment; and a power switch for permitting manual operation of said light members, said power switch being mounted on said housing member and being electrically coupled to said light members, said solar power source plate member, and said battery source.

10. An attitude indicator system, comprising:

an airplane having a dash with an upper surface; and an attitude indicator device for allowing a pilot to determine an aircraft's attitude in the case of instrument or power failure, said attitude indicator device being rested on said upper surface of said dash of said airplane, said attitude indicator device comprising:

a housing member comprising an elongate first portion and an elongate second portion, each of said portions having a top surface and a bottom surface, each of said portions having an inner face positioned perpendicular to the inner face of the other said portion, longitudinal axes of each of said portions being oriented substantially perpendicular to each other;

each of said portions of said housing member having walls defining an interior space;

a plurality of spirit levels, each of said spirit levels being positioned in said interior space of one of said portions of said housing member, each of said spirit levels being visible through one of said inner faces;

a longitudinal axis of each of said spirit levels being oriented substantially parallel to the longitudinal axis of said portion of said housing on which said spirit level is mounted such that at least two of said spirit levels are oriented perpendicular to each other to indicate relative orientation of an airplane with respect to level flight when said housing member is mounted in the airplane in an orientation that is substantially horizontal when the air plane is in level flight for providing the pilot with visual indications of pitch and roll conditions of the airplane and thereby permitting the pilot to maintain level flight without utilization of standard indicator instruments of the airplane.

11. The system of claim 10 wherein a plurality of light members are mounted on said housing, said light members being positioned adjacent to said spirit levels such that said light members illuminate said spirit levels to permit the pilot to see said spirit levels in dark conditions.

12. The system of claim 10 wherein said first portion of said housing member includes a pitch-axis spirit level, said pitch-axis spirit level being positioned such that a longitudinal axis of said pitch-axis spirit level is substantially parallel to a longitudinal axis of said first portion, said pitch-axis spirit level being adapted for indicating the pitch condition of the airplane; and wherein said first portion of said housing member includes an pitch-axis light member, said pitch-axis light member being adapted for illuminating said pitch-axis spirit level.

13. The system of claim 12 wherein said second portion of said housing member includes a roll-axis spirit level, said roll-axis spirit level being positioned such that a longitudinal axis of said roll-axis spirit level is substantially parallel to a longitudinal axis of said second portion, said roll-axis spirit level being adapted for indicating a roll attitude of the airplane; and wherein said second portion of said housing member includes a roll-axis light member, said roll-axis light member being adapted for illuminating said roll-axis spirit level.

14. The system of claim 10 further comprising a solar power source plate member mounted on said housing for providing power to said light members, said solar power source plate member being coupled to said top surface of said housing.

15. The system of claim 14 further comprising:

a battery source located in a battery compartment in said housing and being electrically coupled to said light members and said solar power source plate member;

said battery source being continuously recharged by said solar power source plate member when said solar power source plate member is producing electricity thereby maintaining a full charge in said battery source so that said battery source provides backup power to said light members when said solar power source plate member is not producing electricity due to a lack of light.

16. The system of claim 15 wherein said battery compartment of said second portion includes a battery cover, said battery cover being positioned on an end surface of said distal end of said second portion such that said battery cover is adapted for retaining said battery source in said battery compartment.

17. The system of claim 16 further comprising a power switch for permitting manual operation of said light members, said power switch being mounted on said housing member and being electrically coupled to said light members, said solar power source plate member, and said battery source.

* * * * *